US012728698B2

(12) United States Patent
Kim

(10) Patent No.: US 12,728,698 B2
(45) Date of Patent: Sep. 8, 2026

(54) VEHICLE HVAC SYSTEM

(71) Applicants: Hyundai Motor Company, Seoul (KR); Kia Corporation, Seoul (KR)

(72) Inventor: Kwang Min Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 419 days.

(21) Appl. No.: 18/329,808

(22) Filed: Jun. 6, 2023

(65) Prior Publication Data

US 2024/0190209 A1 Jun. 13, 2024

(30) Foreign Application Priority Data

Dec. 12, 2022 (KR) ........................ 10-2022-0172993

(51) Int. Cl.
*B60H 1/00* (2006.01)
*B60H 1/32* (2006.01)

(52) U.S. Cl.
CPC ..... *B60H 1/00885* (2013.01); *B60H 1/00278* (2013.01); *B60H 1/3228* (2019.05)

(58) Field of Classification Search
CPC ............ B60H 1/00278; B60H 1/00485; B60H 1/00885; B60H 1/00899; B60H 1/00921; B60H 1/3207; B60H 1/3213; B60H 1/3227; B60H 1/3228; B60H 2001/00928; B60H 2001/325; B60Y 2200/91
See application file for complete search history.

(56) References Cited

U.S. PATENT DOCUMENTS 4,881,718 A * 11/1989 Champagne .......... F16K 5/0605 251/316
5,779,141 A * 7/1998 Okumura et al. . B60H 1/00485 236/78 D (Continued)

FOREIGN PATENT DOCUMENTS

KR 20140091187 A * 7/2014 ........... B60H 1/2221
WO WO-2022050586 A1 * 3/2022 ......... B60H 1/00385

OTHER PUBLICATIONS

Choi, Heating System For Vehicle, Jul. 21, 2014, KR 20140091187 A, Whole Document (Year: 2014).*

(Continued)

*Primary Examiner* — Elizabeth J Martin
*Assistant Examiner* — Adam Dorrel Moore
(74) *Attorney, Agent, or Firm* — Slater Matsil, LLP

(57) ABSTRACT

An embodiment heating, ventilation, and air conditioning (HVAC) system for a vehicle includes a compressor, an interior condenser disposed on a downstream side of the compressor, a water-cooled heat exchanger disposed on a downstream side of the interior condenser and configured to transfer heat between a refrigerant and a coolant circulating in a coolant system, a refrigerant heat exchanger disposed on an upstream side of the compressor and configured to transfer heat between the refrigerant discharged from the water-cooled heat exchanger and the refrigerant discharged from the interior condenser, and a first control valve disposed between the water-cooled heat exchanger and the interior condenser and configured to control a flow of the refrigerant between the interior condenser, the water-cooled heat exchanger, and the refrigerant heat exchanger.

20 Claims, 11 Drawing Sheets

(56) References Cited

U.S. PATENT DOCUMENTS

| | | | | |
|---|---|---|---|---|
| 2020/0041070 | A1* | 2/2020 | Werlen et al. | F17C 5/007 |
| 2020/0141502 | A1* | 5/2020 | Kondo et al. | F16K 5/0626 |
| 2020/0180391 | A1* | 6/2020 | Kim | B60H 1/00278 |
| 2021/0197644 | A1* | 7/2021 | Iino et al. | B60H 1/3204 |
| 2022/0234420 | A1* | 7/2022 | Hall | B60H 1/143 |
| 2022/0275982 | A1* | 9/2022 | Mieda | F25B 40/02 |
| 2025/0033436 | A1* | 1/2025 | Park | B60H 1/00921 |

OTHER PUBLICATIONS

Choi, Vapor Injection Module and Heat Pump System Using Same , Mar. 10, 2022,WO 2022050586 A1, Whole Document (Year: 2022).*

* cited by examiner

VEHICLE HVAC SYSTEM

CROSS-REFERENCE TO RELATED APPLICATIONS

This application claims the benefit of Korean Patent Application No. 10-2022-0172993, filed on Dec. 12, 2022, which application is hereby incorporated herein by reference.

TECHNICAL FIELD

The present disclosure relates to a vehicle heating, ventilation, and air conditioning (HVAC) system.

BACKGROUND

With a growing interest in energy efficiency and environmental issues, there is a demand for development of eco-friendly vehicles that can replace internal combustion engine vehicles. Such eco-friendly vehicles are classified into electric vehicles which are driven by using fuel cells or electricity as a power source and hybrid vehicles which are driven by using an engine and a battery.

Electric vehicles or hybrid vehicles include a heating, ventilation, and air conditioning (HVAC) system for air conditioning in a passenger compartment. The HVAC system may be configured to heat and cool the air in the passenger compartment for passenger comfort.

In order to ensure driving safety, electric vehicles or hybrid vehicles include a powertrain cooling system designed to keep powertrain components of a powertrain system at appropriate temperatures and a battery cooling system designed to keep a battery at an appropriate temperature. The powertrain cooling system may cool the powertrain components such as an electric motor, an inverter, an on-board charger (OBC), and a low DC-DC converter (LDC), thereby keeping the powertrain components at their respective appropriate temperatures. The battery cooling system may cool the battery, thereby keeping the battery at its appropriate temperature.

A refrigerant circulating in the HVAC system of the electric vehicle may absorb heat from a powertrain-side coolant circulating in the powertrain cooling system through a water-cooled heat exchanger and be evaporated.

However, in a condition in which the temperature of ambient air is relatively low (for example, −20° C. to −5° C.), the temperature of the powertrain-side coolant may be relatively lowered, and accordingly the refrigerant may fail to sufficiently absorb heat from the powertrain-side coolant. As a result, the evaporation of the refrigerant may be reduced, and a suction pressure of a compressor may be lowered below a threshold pressure. When the suction pressure of the compressor is lower than the threshold pressure, efficiency of the compressor may be reduced, and accordingly revolutions per minute (RPM) of the compressor may be lowered below a threshold RPM or the compressor may stop. As a result, the coefficient of performance (COP) of the HVAC system may be degraded. Since the heating of the passenger compartment with the use of the refrigerant is not performed, but the passenger compartment is only heated by an electric heater of the HVAC system, electric efficiency of the electric vehicle may be reduced.

While the HVAC system is operating in a heating and dehumidifying mode to perform the heating of the passenger compartment and the dehumidification of the passenger compartment at the same time, the HVAC system may automatically control the temperature of the passenger compartment to reach a target temperature. When the temperature of the passenger compartment reaches the target temperature, the RPM of a blower may be relatively reduced so that the rate of air blown into the passenger compartment may be relatively reduced. As the rate of air blown into the passenger compartment is reduced, an interior condenser of the HVAC system may fail to sufficiently release heat to the air, and accordingly condensation of the refrigerant may be relatively reduced. The temperature and pressure of the refrigerant discharged from the interior condenser may relatively increase. Accordingly, the discharge pressure of the compressor may relatively increase, and the temperature of the air blown into the passenger compartment may increase above the target temperature. In order for the HVAC system to adjust the temperature of the air blown into the passenger compartment, an air mixing door may move to a mixing position, and the flow rate of the refrigerant into an evaporator for dehumidification may be relatively reduced, so the temperature of the evaporator may become higher than the ambient temperature. Thus, the HVAC system may automatically switch from a heating mode to a cooling mode, and the electric heater for heating the passenger compartment may operate so that the electric efficiency of the electric vehicle may be reduced.

In the HVAC system according to the related art, as the heat absorption of the refrigerant is reduced in a condition in which the ambient temperature is relatively low, the amount of evaporation of the refrigerant may be insufficient. Accordingly, the heating of the passenger compartment with the use of the refrigerant may not be smoothly performed due to the RPM reduction or stop of the compressor, and the passenger compartment may be heated by the electric heater so that the electric efficiency of the electric vehicle may be reduced.

In addition, when the HVAC system according to the related art operates in the heating and dehumidifying mode, it may fail to smoothly perform the heating of the passenger compartment using the refrigerant, but may perform the heating of the passenger compartment using the electric heater, resulting in reduced electric efficiency of the electric vehicle.

In addition, as the HVAC system according to the related art includes a dehumidification-side expansion valve for dehumidifying the passenger compartment, the manufacturing cost thereof may increase.

The above information described in this background section is provided to assist in understanding the background of the inventive concept and may include any technical concept which is not considered as the prior art that is already known to those skilled in the art.

SUMMARY

The present disclosure relates to a vehicle heating, ventilation, and air conditioning (HVAC) system. Particular embodiments relate to a vehicle HVAC system designed to improve its coefficient of performance (COP) using a refrigerant by providing a sufficient heat source for evaporation of the refrigerant under conditions of relatively low ambient temperature, thereby improving electric efficiency of an electric vehicle.

Embodiments of the present disclosure can solve problems occurring in the prior art while advantages achieved by the prior art are maintained intact.

An embodiment of the present disclosure provides a vehicle heating, ventilation, and air conditioning (HVAC) system designed to improve its coefficient of performance (COP) with the use of a refrigerant by providing a heat source sufficient to evaporate the refrigerant when the HVAC system operates in a heating mode in a condition in which an ambient temperature is relatively low, thereby minimizing the use of an electric heater and improving electric efficiency of an electric vehicle.

According to an embodiment of the present disclosure, a vehicle HVAC system may include a compressor, an interior condenser disposed on the downstream side of the compressor, a water-cooled heat exchanger disposed on the downstream side of the interior condenser and configured to transfer heat between a refrigerant and a coolant circulating in a coolant system, a refrigerant heat exchanger disposed on the upstream side of the compressor and configured to transfer heat between the refrigerant discharged from the water-cooled heat exchanger and the refrigerant discharged from the interior condenser, and a first control valve located between the water-cooled heat exchanger and the interior condenser and configured to control the flow of the refrigerant between the interior condenser, the water-cooled heat exchanger, and the refrigerant heat exchanger.

The refrigerant heat exchanger may include a first passage through which the refrigerant discharged from the water-cooled heat exchanger passes and a second passage through which the refrigerant discharged from the interior condenser passes.

The first control valve may include an inlet port communicating with the interior condenser, a first outlet port communicating with the water-cooled heat exchanger, and a second outlet port communicating with the second passage of the refrigerant heat exchanger.

The opening degree of the first outlet port may be adjusted based on a suction pressure of the compressor.

The opening degree of the second outlet port may be adjusted based on the degree of superheat of the refrigerant.

The vehicle HVAC system may further include a first bypass line extending from the second outlet port to the downstream side of the second passage of the refrigerant heat exchanger, and the first bypass line may be directly connected to the second outlet port.

The first control valve may include a valve body having the inlet port, the first outlet port, and the second outlet port, and a ball component rotatably received in the valve body. The ball component may include an inlet passage communicating with the inlet port, a first outlet passage and a second outlet passage branching off from the inlet passage, and a groove extending from the first outlet passage. A cross-sectional area of the groove may be less than a cross-sectional area of the first outlet passage.

The ball component may be configured to rotate around a rotation axis, and the rotation axis of the ball component may be aligned with a central axis of the inlet port.

The vehicle HVAC system may further include an exterior heat exchanger disposed on the downstream side of the water-cooled heat exchanger and a second control valve located between the water-cooled heat exchanger and the exterior heat exchanger. The second control valve may be configured to control the flow of the refrigerant between the water-cooled heat exchanger, the exterior heat exchanger, and the first passage of the refrigerant heat exchanger.

The second control valve may include an inlet port communicating with the water-cooled heat exchanger, a first outlet port communicating with the exterior heat exchanger, and a second outlet port communicating with the first passage of the refrigerant heat exchanger.

The second control valve may be configured to allow any one of the first outlet port and the second outlet port to selectively communicate with the inlet port.

The vehicle HVAC system may further include a second bypass line extending from the second outlet port to the downstream side of the first passage of the refrigerant heat exchanger, and the second bypass line may be directly connected to the second outlet port.

The vehicle HVAC system may further include a cooling-side expansion valve disposed on the downstream side of the exterior heat exchanger, an evaporator disposed on the downstream side of the cooling-side expansion valve, a distribution line extending from a point between an outlet of the exterior heat exchanger and an inlet of the cooling-side expansion valve to a point between an outlet of the evaporator and an inlet of the compressor, and a battery chiller fluidly connected to the distribution line and thermally connected to a battery cooling system.

The vehicle HVAC system may further include a third control valve located between the second passage of the refrigerant heat exchanger, the inlet of the cooling-side expansion valve, and the distribution line. The third control valve may be configured to control the flow of the refrigerant between the second passage of the refrigerant heat exchanger, the cooling-side expansion valve, and the battery chiller.

The third control valve may include an inlet port communicating with the second passage of the refrigerant heat exchanger, a first outlet port communicating with the cooling-side expansion valve, and a second outlet port communicating with the distribution line.

The opening degree of the first outlet port may be adjusted based on a target temperature of the evaporator.

The opening degree of the second outlet port may be adjusted based on a temperature of the battery.

The third control valve may include a valve body having the inlet port, the first outlet port, and the second outlet port, and a ball component rotatably received in the valve body. The ball component may include an inlet passage communicating with the inlet port, a first outlet passage and a second outlet passage branching off from the inlet passage, and a pair of grooves symmetrically extending from the first outlet passage. A cross-sectional area of each groove may be less than a cross-sectional area of the first outlet passage.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
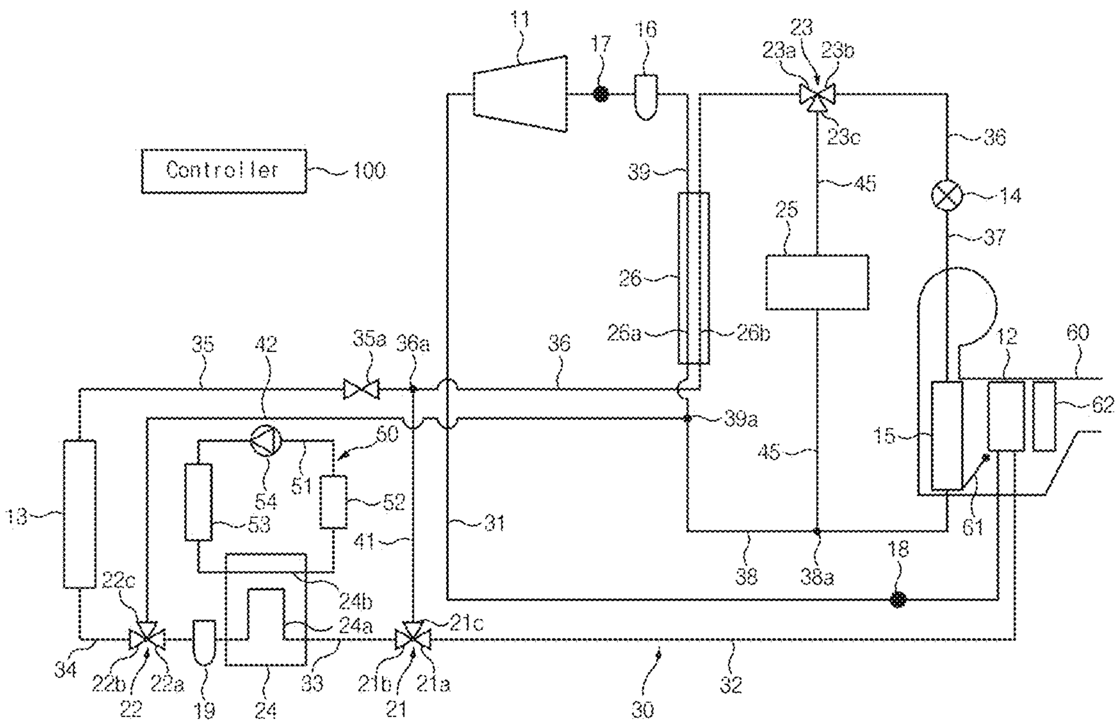
FIG. 1 illustrates a vehicle heating, ventilation, and air conditioning (HVAC) system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

Referring to FIG. 1, a vehicle heating, ventilation, and air conditioning (HVAC) system according to an exemplary embodiment of the present disclosure may be configured to heat and cool air in a passenger compartment of the vehicle through a phase change of a circulating refrigerant. The HVAC system may include a refrigerant circulation path 30 through which the refrigerant is allowed to circulate and an HVAC case 60. The refrigerant circulation path 30 may be fluidly connected to a compressor 11, an interior condenser 12, a water-cooled heat exchanger 24, an exterior heat exchanger 13, a cooling-side expansion valve 14, and an evaporator 15. The refrigerant circulation path 30 may allow the flow of the refrigerant to vary depending on various operating modes of a vehicle thermal management system.

The compressor 11 may compress the refrigerant and allow the refrigerant to circulate. In particular, the compressor 11 may be configured to compress the refrigerant received from the evaporator 15 and/or a battery chiller 25. The compressor 11 may include a compressor motor and a compression section operated by the compressor motor. The refrigerant circulation path 30 may be fluidly connected to the compression section of the compressor 11.

The HVAC system may include an accumulator 16 disposed on the upstream side of the compressor 11. The accumulator 16 may be located between the evaporator 15 and the compressor 11, and the accumulator 16 may separate a liquid refrigerant from the refrigerant which is received from the evaporator 15, thereby preventing the liquid refrigerant from being directed into the compressor 11.

The interior condenser 12 may be configured to condense the refrigerant received from the compressor 11, and accordingly the air passing through the interior condenser 12 may be heated by the interior condenser 12. As the air heated by the interior condenser 12 is directed into the passenger compartment, the passenger compartment may be heated.

The water-cooled heat exchanger 24 may be disposed on the downstream side of the interior condenser 12. The water-cooled heat exchanger 24 may be thermally connected to a coolant system 50. The water-cooled heat exchanger 24 may be configured to transfer heat between a coolant circulating in the coolant system 50 and the refrigerant circulating in the refrigerant circulation path 30.

According to an exemplary embodiment, the coolant system 50 may be a powertrain cooling system configured to cool a powertrain component 52. The coolant system 50 may include a coolant circulation path 51 through which the coolant circulates, the powertrain component 52 fluidly connected to the coolant circulation path 51, a powertrain radiator 53 fluidly connected to the coolant circulation path 51, and a pump 54. The powertrain component may be an electric motor, an inverter, and a power conversion component. The powertrain radiator 53 may be disposed adjacent to a front grille of the vehicle, and the coolant passing through the powertrain radiator 53 may be cooled by the ambient air forcibly blown by a cooling fan. The powertrain component may have a coolant passage provided inside or outside thereof, and the coolant may pass through the coolant passage. The coolant passage of the powertrain component may be fluidly connected to the coolant circulation path 51.

The water-cooled heat exchanger 24 may include a first passage 24*a* fluidly connected to the refrigerant circulation path 30 and a second passage 24*b* fluidly connected to the coolant circulation path 51. When the temperature of the powertrain component increases, the coolant may absorb heat from the powertrain component so that the temperature of the coolant may relatively increase. The refrigerant passing through the first passage 24*a* of the water-cooled heat exchanger 24 may absorb heat from the coolant passing through the second passage 24*b*, and accordingly the refrigerant may be evaporated in the water-cooled heat exchanger 24.

The HVAC system according to an exemplary embodiment of the present disclosure may include a refrigerant heat exchanger 26 disposed on the upstream side of the compressor 11. The refrigerant heat exchanger 26 may be configured to transfer heat between the refrigerant discharged from the water-cooled heat exchanger 24 and the refrigerant discharged from the interior condenser 12. The refrigerant heat exchanger 26 may include a first passage 26*a* through which the refrigerant discharged from the evaporator 15 and/or the water-cooled heat exchanger 24 passes and a second passage 26*b* through which the refrigerant discharged from the exterior heat exchanger 13 and/or the interior condenser 12 passes. The first passage 26*a* and the second passage 26*b* may be fluidly separated from each other.

When an ambient temperature is relatively low, and the HVAC system operates in a heating mode, the refrigerant heat exchanger 26 may be configured to transfer heat from the high-pressure refrigerant discharged from the interior condenser 12 to the low-pressure refrigerant discharged from the water-cooled heat exchanger 24.

The HVAC system according to an exemplary embodiment of the present disclosure may further include a receiver drier 19 disposed on the downstream side of the water-cooled heat exchanger 24. The receiver drier 19 may absorb moisture contained in the refrigerant discharged from the water-cooled heat exchanger 24 and store it to smoothly supply the refrigerant. The receiver drier 19 may be adjacent to an outlet of the first passage 24*a* of the water-cooled heat exchanger 24.

The exterior heat exchanger 13 may be disposed on the downstream side of the water-cooled heat exchanger 24. The exterior heat exchanger 13 may be disposed adjacent to the front grille of the vehicle, and the exterior heat exchanger 13 may be exposed to the outside so that heat may be transferred between the exterior heat exchanger 13 and the ambient air. During a cooling operation of the HVAC system, the exterior heat exchanger 13 may be configured to condense the refrigerant received from the interior condenser 12. That is, the exterior heat exchanger 13 may serve as an exterior condenser that condenses the refrigerant by transferring heat to the ambient air during the cooling operation of the HVAC system. During a heating operation of the HVAC system, the exterior heat exchanger 13 may be configured to evaporate the refrigerant received from the water-cooled heat exchanger 24. That is, the exterior heat exchanger 13 may serve as an exterior evaporator that evaporates the refrigerant by absorbing heat from the ambient air during the heating operation of the HVAC system. In particular, the exterior heat exchanger 13 may exchange heat with the ambient air forcibly blown by the cooling fan so that a heat transfer rate between the exterior heat exchanger 13 and the ambient air may be further increased.

The HVAC system according to an exemplary embodiment of the present disclosure may further include a distribution line 45 extending from a point between an outlet of the exterior heat exchanger 13 and an inlet of the cooling-side expansion valve 14 to a point between an outlet of the evaporator 15 and an inlet of the compressor 11. Specifically, an inlet of the distribution line 45 may be located between the second passage 26*b* of the refrigerant heat exchanger 26 and the inlet of the cooling-side expansion valve 14, and an outlet of the distribution line 45 may be located between the outlet of the evaporator 15 and the first passage 26*a* of the refrigerant heat exchanger 26.

The battery chiller 25 may be fluidly connected to the distribution line 45, and the battery chiller 25 may be configured to transfer heat between the distribution line 45 and a battery cooling system (not shown). The battery cooling system may be configured to allow a coolant exchanging heat with a battery to circulate therein. The battery chiller 25 may be configured to transfer heat between the refrigerant passing through the distribution line 45 and the coolant circulating in the battery cooling system. That is, the battery chiller 25 may be thermally connected to the battery cooling system.

The battery chiller 25 may be configured to transfer heat between the refrigerant passing through the distribution line 45 and the coolant circulating in the battery cooling system. The refrigerant may absorb heat from the battery-side coolant so that it may be evaporated, and the battery-side coolant may release heat to the refrigerant so that it may be cooled.

The cooling-side expansion valve 14 may be disposed on the downstream side of the exterior heat exchanger 13, and the cooling-side expansion valve 14 may be disposed between the exterior heat exchanger 13 and the evaporator 15 in the refrigerant circulation path 30. The cooling-side expansion valve 14 may be disposed on the upstream side of the evaporator 15 and adjust the flow of the refrigerant and/or the flow rate of the refrigerant into the evaporator 15. During the cooling operation of the HVAC system, the cooling-side expansion valve 14 may be configured to expand the refrigerant received from the exterior heat exchanger 13.

According to an exemplary embodiment, the cooling-side expansion valve 14 may be a thermal expansion valve (TXV) which senses the temperature and/or pressure of the refrigerant and adjusts the opening degree of the cooling-side expansion valve 14.

When the cooling-side expansion valve 14 is closed, the refrigerant may not be directed into the cooling-side expansion valve 14 and the evaporator 15, but may only be directed into the battery chiller 25. That is, when the cooling-side expansion valve 14 is closed, the cooling operation of the HVAC system may not be performed, and only the battery chiller 25 may be cooled or the heating operation of the HVAC system may be performed. When the cooling-side expansion valve 14 is opened, the refrigerant may be directed into the cooling-side expansion valve 14 and the evaporator 15. That is, when the cooling-side expansion valve 14 is opened, the cooling operation of the HVAC system may be performed.

The evaporator 15 may be disposed on the downstream side of the cooling-side expansion valve 14 and receive the refrigerant expanded by the cooling-side expansion valve 14. The evaporator 15 may be configured to cool the air using the refrigerant received from the cooling-side expansion valve 14. That is, the refrigerant expanded by the cooling-side expansion valve 14 may absorb heat from the air and be evaporated in the evaporator 15. Accordingly, during the cooling operation of the HVAC system, the evaporator 15 may be configured to cool the air using the refrigerant cooled by the exterior heat exchanger 13 and expanded by the cooling-side expansion valve 14, and the air cooled by the refrigerant may be directed into the passenger compartment.

The HVAC system according to an exemplary embodiment of the present disclosure may include a first sensor 17 disposed on the upstream side of the compressor 11 and adjacent to the inlet of the compressor 11 and a second sensor 18 located between the compressor 11 and the interior condenser 12.

The first sensor 17 may sense the pressure and temperature of the low-pressure refrigerant flowing into the inlet of the compressor 11. That is, the first sensor 17 may sense a suction pressure of the compressor 11. In addition, the degree of superheat of the refrigerant may be determined based on the pressure and temperature of the low-pressure refrigerant sensed by the first sensor 17.

The second sensor 18 may sense the pressure and temperature of the high-pressure refrigerant discharged from an outlet of the compressor 11.

The HVAC case 60 may have an inlet and an outlet, and the HVAC case 60 may be configured to allow the air to be directed into the passenger compartment of the vehicle. The evaporator 15 and the interior condenser 12 may be located inside the HVAC case 60. An air mixing door 61 may be disposed between the evaporator 15 and the interior condenser 12, and an electric heater 62 such as a PTC (positive temperature coefficient) heater may be disposed on the downstream side of the interior condenser 12.

The HVAC system according to an exemplary embodiment of the present disclosure may further include a first bypass line 41 extending from a point between an outlet of the interior condenser 12 and an inlet of the water-cooled heat exchanger 24 to a point between the outlet of the exterior heat exchanger 13 and the inlet of the cooling-side expansion valve 14. Accordingly, the refrigerant passing through the first bypass line 41 may bypass the water-cooled heat exchanger 24 and the exterior heat exchanger 13.

The HVAC system according to an exemplary embodiment of the present disclosure may include a first control valve 21 located between the water-cooled heat exchanger 24, the interior condenser 12, and the first bypass line 41. The first control valve 21 may be configured to control the flow of the refrigerant between the interior condenser 12, the water-cooled heat exchanger 24, and the refrigerant heat exchanger 26. Specifically, the first control valve 21 may control the flow of the refrigerant (the direction of the refrigerant, the flow rate of the refrigerant, etc.) from the interior condenser 12 to the water-cooled heat exchanger 24 and/or the refrigerant heat exchanger 26.

The first control valve 21 may include an inlet port 21*a* communicating with the interior condenser 12, a first outlet port 21*b* communicating with the water-cooled heat exchanger 24, and a second outlet port 21*c* communicating with the second passage 26*b* of the refrigerant heat exchanger 26 through the first bypass line 41.

The inlet port 21*a* may receive the refrigerant discharged from the interior condenser 12.

As the opening degree of the first outlet port 21*b* is adjusted, the refrigerant may be expanded through the first outlet port 21*b*, and the flow rate of the refrigerant into the water-cooled heat exchanger 24 may be adjusted. When the opening degree of the first outlet port 21*b* is adjusted, the refrigerant may be expanded at the first outlet port 21*b*, and the expanded refrigerant may be directed into the water-cooled heat exchanger 24.

Specifically, the opening degree of the first outlet port 21*b* may be adjusted based on the pressure of the low-pressure refrigerant (the suction pressure of the compressor 11) sensed by the first sensor 17 so that the refrigerant discharged from the first outlet port 21*b* may be expanded, and the pressure and temperature of the refrigerant discharged from the first outlet port 21*b* may decrease. In particular, when the HVAC system operates in the heating mode, the opening degree of the first outlet port 21*b* may be adjusted, and the first outlet port 21*b* may serve as a heating-side expansion valve that expands the refrigerant directed into the water-cooled heat exchanger 24.

In addition, the first outlet port 21*b* may be fully opened or fully closed. When the first outlet port 21*b* is fully opened, the refrigerant may be directed into the water-cooled heat exchanger 24 without expanding.

An inlet of the first bypass line 41 may be directly connected to the second outlet port 21*c*. As the opening degree of the second outlet port 21*c* is adjusted, the flow rate of the refrigerant into the first bypass line 41 may be adjusted.

Specifically, the opening degree of the second outlet port 21*c* may be adjusted based on the degree of superheat of the refrigerant, and a controller 100 may determine the degree of superheat of the refrigerant based on the temperature of the refrigerant and the pressure of the refrigerant sensed by the first sensor 17. When the second outlet port 21*c* is partially opened, at least a portion of the refrigerant discharged from the interior condenser 12 may be directed into the first bypass line 41 so that it may bypass the water-cooled heat exchanger 24. In particular, when the HVAC system operates in the heating mode, the opening degree of the second outlet port 21*c* may be adjusted, and the second outlet port 21*c* may serve as a flow rate control valve that adjusts the flow rate of the refrigerant into the refrigerant heat exchanger 26. In addition, the second outlet port 21*c* may be fully opened or fully closed.

Figure 4A:
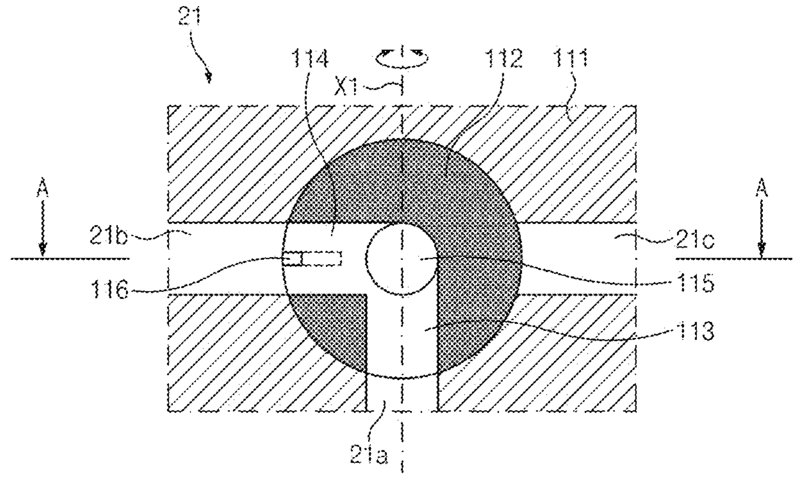
FIG. 4A illustrates a side sectional view of a first control valve of a vehicle HVAC system according to an exemplary embodiment of the present disclosure.

Referring to FIG. 4A, the first control valve 21 may include a valve body 111 and a ball component 112 rotatably received in the valve body 111.

The valve body 111 may have the inlet port 21*a*, the first outlet port 21*b*, and the second outlet port 21*c*. The first outlet port 21*b* may be opposite to the second outlet port 21*c*, and a central axis of the first outlet port 21*b* may be aligned with a central axis of the second outlet port 21*c*. The central axis of the first outlet port 21*b* and the central axis of the second outlet port 21*c* may be perpendicular to a central axis of the inlet port 21*a*.

The ball component 112 may be configured to rotate around a rotation axis X1 between the first outlet port 21*b* and the second outlet port 21*c* in the valve body 111. The ball component 112 may be rotated by an actuator (not shown) such as an electric motor. The rotation axis X1 of the ball component 112 may be aligned with the central axis of the inlet port 21*a*.

Figure 4B:
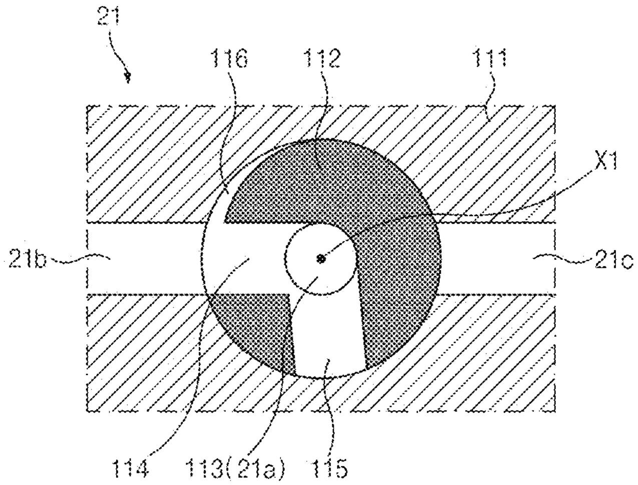
FIG. 4B illustrates a cross-sectional view, taken along line A-A of FIG. 4A, in a state in which a ball component of the first control valve is in a first position.

Referring to FIGS. 4A and 4B, the ball component 112 may have a T-shaped passage having an inlet passage 113 and a first outlet passage 114 and a second outlet passage 115 branching off from the inlet passage 113. The first outlet passage 114 may intersect with the second outlet passage 115 at a predetermined angle. The ball component 112 may have a groove 116 communicating with the first outlet passage 114, and the groove 116 may extend over a predetermined length from the first outlet passage 114 toward the opposite of the first outlet passage 114 along an exterior surface of the ball component 112. A cross-sectional area of the groove 116 may be significantly less than a cross-sectional area of the first outlet passage 114. The cross-sectional area of the groove 116 may gradually decrease in a direction away from the first outlet passage 114. According to changes in rotational position of the ball component 112, the first outlet passage 114 may selectively communicate with the first outlet port 21*b*, and the second outlet passage 115 may selectively communicate with the second outlet port 21*c*. When the first outlet passage 114 communicates with the first outlet port 21*b*, the second outlet passage 115 may not communicate with the second outlet port 21*c*. When the groove 116 communicates with the first outlet port 21*b*, the second outlet passage 115 may communicate with the second outlet port 21*c*.

When the groove 116 communicates with the first outlet port 21*b* as the rotational position of the ball component 112 changes, an overlap area between the groove 116 and the first outlet port 21*b* may be varied. The refrigerant passing through the groove 116 may be expanded, and the flow rate of the refrigerant discharged from the first outlet port 21*b* may be adjusted. Accordingly, the pressure and temperature of the refrigerant discharged from the first outlet port 21*b* may decrease.

When the first outlet passage 114 communicates with the first outlet port 21*b* as the rotational position of the ball component 112 changes, an overlap area between the first outlet passage 114 and the first outlet port 21*b* may be varied so that the flow rate of the refrigerant discharged from the first outlet passage 114 and the first outlet port 21*b* may be adjusted. Since the groove 116 does not directly communicate with the first outlet port 21*b*, the refrigerant may not be expanded.

The inlet passage 113 may continuously communicate with the inlet port 21*a*. Regardless of the rotational position of the ball component 112, an overlap area between the inlet passage 113 and the inlet port 21*a* may be kept constant so that the opening degree of the inlet passage 113 may always be constant.

Referring to FIG. 4B, when the ball component 112 is in a first position, the first outlet passage 114 may fully communicate with the first outlet port 21*b* so that the first outlet port 21*b* may be fully opened. As the first outlet port 21*b* is fully opened, the refrigerant may not be expanded but may be directed into the first passage 24*a* of the water-cooled heat exchanger 24. As the second outlet passage 115 is completely blocked in the valve body 111, the second outlet port 21*c* may be fully closed. Under the condition illustrated in FIG. 4B, the HVAC system may operate in any one of a cooling mode for cooling the passenger compartment, a battery cooling mode for cooling the battery, and a cooling and battery cooling mode for simultaneously cooling the passenger compartment and cooling the battery.

Figure 4C:
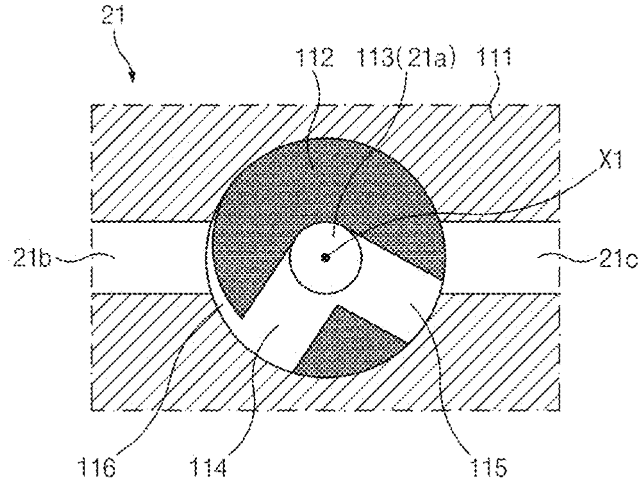
FIG. 4C illustrates a state in which the ball component of the first control valve is in a second position.

Referring to FIG. 4C, when the ball component 112 is in a second position, the groove 116 may communicate with the first outlet port 21*b* so that the opening degree of the first outlet port 21*b* may be adjusted, and the second outlet passage 115 may communicate with the second outlet port 21*c* so that the opening degree of the second outlet port 21*c* may be adjusted. As the overlap area between the groove 116 and the first outlet port 21*b* is adjusted, the opening degree of the first outlet port 21*b* may be adjusted. When the refrigerant is discharged from the first outlet port 21*b* through the groove 116, the refrigerant may be expanded, and accordingly the pressure and temperature of the refrigerant may decrease. As an overlap area between the second outlet passage 115 and the second outlet port 21*c* is adjusted, the opening degree of the second outlet port 21*c* may be adjusted, and accordingly the flow rate of the refrigerant into the first bypass line 41 may be adjusted. Under the condition illustrated in FIG. 4C, the HVAC system may operate in any one of a heating mode for heating the passenger compartment and a heating and dehumidifying mode for simultaneously heating the passenger compartment and dehumidifying the passenger compartment.

The HVAC system according to an exemplary embodiment of the present disclosure may further include a second bypass line 42 extending from a point between the outlet of the water-cooled heat exchanger 24 and an inlet of the exterior heat exchanger 13 to a point between the outlet of the evaporator 15 and the inlet of the compressor 11. The refrigerant passing through the second bypass line 42 may bypass the exterior heat exchanger 13.

The HVAC system according to an exemplary embodiment of the present disclosure may include a second control valve 22 located between the water-cooled heat exchanger 24, the exterior heat exchanger 13, and the second bypass line 42. The second control valve 22 may be configured to control the flow of the refrigerant (the direction of the refrigerant, the flow rate of the refrigerant, etc.) between the water-cooled heat exchanger 24, the exterior heat exchanger 13, and the refrigerant heat exchanger 26. Specifically, the second control valve 22 may control the flow of the refrigerant from the water-cooled heat exchanger 24 to the exterior heat exchanger 13 and/or the refrigerant heat exchanger 26.

The second control valve 22 may include an inlet port 22*a* communicating with the water-cooled heat exchanger 24, a first outlet port 22*b* communicating with the exterior heat exchanger 13, and a second outlet port 22*c* communicating with the first passage 26*a* of the refrigerant heat exchanger 26 through the second bypass line 42.

The second control valve 22 may be switched to allow any one of the first outlet port 22*b* and the second outlet port 22*c* to selectively communicate with the inlet port 22*a*. For example, when the second control valve 22 is switched to allow the second outlet port 22*c* to communicate with the inlet port 22*a*, the refrigerant discharged from the water-cooled heat exchanger 24 may be directed into the compressor 11 through the second bypass line 42. That is, the refrigerant may circulate through the second bypass line 42 without passing through the exterior heat exchanger 13. When the second control valve 22 is switched to allow the first outlet port 22*b* to communicate with the inlet port 22*a*, the refrigerant discharged from the water-cooled heat exchanger 24 may be directed into the exterior heat exchanger 13 without passing through the second bypass line 42.

The HVAC system may further include a third control valve 23 located at a point between an outlet of the second passage 26*b* of the refrigerant heat exchanger 26 and the inlet of the cooling-side expansion valve 14, and the third control valve 23 may be located at the inlet of the distribution line 45. The third control valve 23 may be configured to control the flow of the refrigerant (the direction of the refrigerant, the flow rate of the refrigerant, etc.) between the refrigerant heat exchanger 26, the cooling-side expansion valve 14, and the battery chiller 25. Specifically, the third control valve 23 may control the flow of the refrigerant from the refrigerant heat exchanger 26 to the cooling-side expansion valve 14 and/or the battery chiller 25.

The third control valve 23 may include an inlet port 23*a* communicating with the second passage 26*b* of the refrigerant heat exchanger 26, a first outlet port 23*b* communicating with the cooling-side expansion valve 14, and a second outlet port 23*c* communicating with the distribution line 45.

The inlet port 23*a* may receive the refrigerant discharged from the second passage 26*b* of the refrigerant heat exchanger 26.

The opening degree of the first outlet port 23*b* may be adjusted based on a target temperature of the evaporator 15 so that the flow rate of the refrigerant into the cooling-side expansion valve 14 may be adjusted.

In addition, as the first outlet port 23*b* is fully opened or fully closed, it may serve as a shut-off valve located on the upstream side of the cooling-side expansion valve 14.

The inlet of the distribution line 45 may be directly connected to the second outlet port 23*c*. The second outlet port 23*c* may be configured to expand the refrigerant directed into the battery chiller 25 as the opening degree of the second outlet port 23*c* is adjusted based on a temperature of the battery. When the opening degree of the second outlet port 23*c* is adjusted, the refrigerant may be expanded at the second outlet port 23*c*, and the expanded refrigerant may be directed into the battery chiller 25. As the opening degree of the second outlet port 23*c* is adjusted, the refrigerant discharged from the second outlet port 23*c* may be expanded, and accordingly the pressure and temperature of the refrigerant discharged from the second outlet port 23*c* may decrease. In particular, when the HVAC system operates in the battery cooling mode for cooling the battery, the opening degree of the second outlet port 23*c* may be adjusted so that the second outlet port 23*c* may serve as a chiller-side expansion valve that expands the refrigerant directed into the battery chiller 25.

In addition, the second outlet port 23*c* may be fully opened or fully closed. When the second outlet port 23*c* is fully opened, the refrigerant may be directed into the battery chiller 25 without expanding.

Figure 5A:
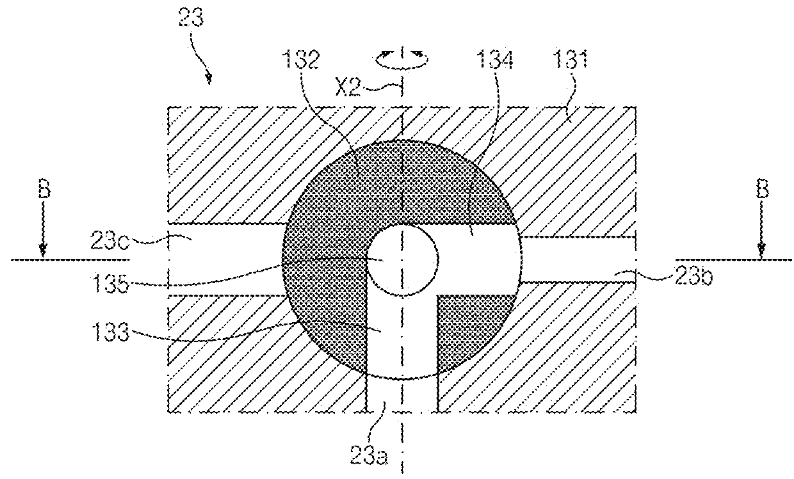
FIG. 5A illustrates a side sectional view of a third control valve of a vehicle HVAC system according to an exemplary embodiment of the present disclosure.

Referring to FIG. 5A, the third control valve 23 may include a valve body 131 and a ball component 132 rotatably received in the valve body 131.

The valve body 131 may have the inlet port 23*a*, the first outlet port 23*b*, and the second outlet port 23*c*. The first outlet port 23*b* may be opposite to the second outlet port 23*c*, and a central axis of the first outlet port 23*b* may be aligned with a central axis of the second outlet port 23*c*. The central axis of the first outlet port 23*b* and the central axis of the second outlet port 23*c* may be perpendicular to a central axis of the inlet port 23*a*. A diameter of the first outlet port 23*b* may be less than a diameter of the second outlet port 23*c*.

The ball component 132 may be configured to rotate around a rotation axis X2 between the first outlet port 23*b* and the second outlet port 23*c* in the valve body 131. The ball component 132 may be rotated by an actuator (not shown) such as an electric motor. The rotation axis X2 of the ball component 132 may be aligned with the central axis of the inlet port 23*a*.

Figure 5B:
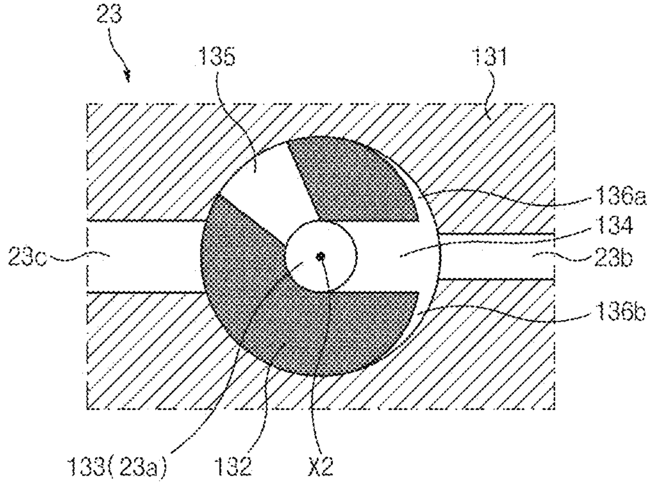
FIG. 5B illustrates a cross-sectional view, taken along line B-B of FIG. 5A, in a state in which a ball component of the third control valve is in a first position.

Referring to FIGS. 5A and 5B, the ball component 132 may have a T-shaped passage having an inlet passage 133 and a first outlet passage 134 and a second outlet passage 135 branching off from the inlet passage 133. The first outlet passage 134 may intersect with the second outlet passage 135 at a predetermined angle. The second outlet passage 135 may have a tapered structure of which a diameter gradually increases from the center of the ball component 132 toward an exterior surface of the ball component 132. The ball component 132 may have a first groove 136*a* and a second groove 136*b* communicating with the first outlet passage 134. The first groove 136*a* may be adjacent to the second outlet passage 135, and the second groove 136*b* may be far from the second outlet passage 135. The first groove 136*a* may be opposite to the second groove 136*b*, and the first groove 136*a* and the second groove 136*b* may extend symmetrically from an end of the first outlet passage 134. Each of the grooves 136*a* and 136*b* may extend over a predetermined length from the first outlet passage 134 toward the opposite of the first outlet passage 134 along the exterior surface of the ball component 132. A cross-sectional area of each of the grooves 136*a* and 136*b* may gradually decrease in a direction away from the first outlet passage 134. The cross-sectional area of each of the grooves 136*a* and 136*b* may be significantly less than a cross-sectional area of the first outlet passage 134.

According to changes in rotational position of the ball component 132, the first outlet passage 134 may selectively communicate with the first outlet port 23*b* and the second outlet port 23*c*, and the second outlet passage 135 may selectively communicate with the first outlet port 23*b* and the second outlet port 23*c*.

When any one of the grooves 136*a* and 136*b* communicates with the second outlet port 23*c* as the rotational position of the ball component 132 changes, an overlap area between the corresponding groove and the second outlet port 23*c* may be varied. The refrigerant passing through the corresponding one of the grooves 136*a* and 136*b* may be expanded, and the flow rate of the refrigerant discharged from the second outlet port 23*c* may be adjusted. Accordingly, the pressure and temperature of the refrigerant discharged from the second outlet port 23*c* may decrease.

The inlet passage 133 may continuously communicate with the inlet port 23*a*. Regardless of the rotational position of the ball component 132, an overlap area between the inlet passage 133 and the inlet port 23*a* may be kept constant so that the opening degree of the inlet passage 133 may be always constant.

Referring to FIG. 5B, when the ball component 132 is in a first position, the first outlet passage 134 may fully communicate with the first outlet port 23*b* so that the first outlet port 23*b* may be fully opened. As the second outlet passage 135 is completely blocked in the valve body 131, the second outlet port 23*c* may be fully closed. Under the condition illustrated in FIG. 5B, the HVAC system may operate in any one of the cooling mode for cooling the passenger compartment and the heating and dehumidifying mode for simultaneously heating the passenger compartment and dehumidifying the passenger compartment.

Figure 5C:
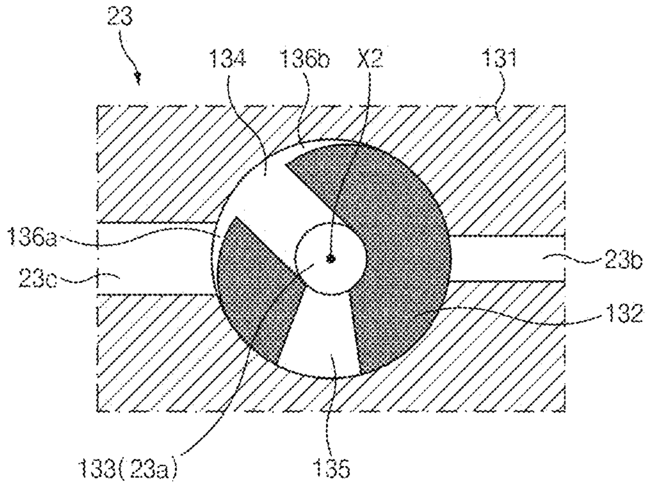
FIG. 5C illustrates a state in which the ball component of the third control valve is in a second position.

Referring to FIG. 5C, when the ball component 132 is in a second position, the first groove 136*a* may communicate with the second outlet port 23*c* so that the opening degree of the second outlet port 23*c* may be adjusted. As the second outlet passage 135 is completely blocked in the valve body 131, the first outlet port 23*b* may be fully closed. As the overlap area between the first groove 136*a* and the second outlet port 23*c* is adjusted, the opening degree of the second outlet port 23*c* may be adjusted. Accordingly, when the refrigerant is discharged from the second outlet port 23*c* through the first groove 136*a*, the refrigerant may be expanded, and the pressure and temperature of the refrigerant may decrease. Under the condition illustrated in FIG. 5C, the HVAC system may operate in any one of the heating mode for heating the passenger compartment and the battery cooling mode for cooling the battery.

Figure 5D:
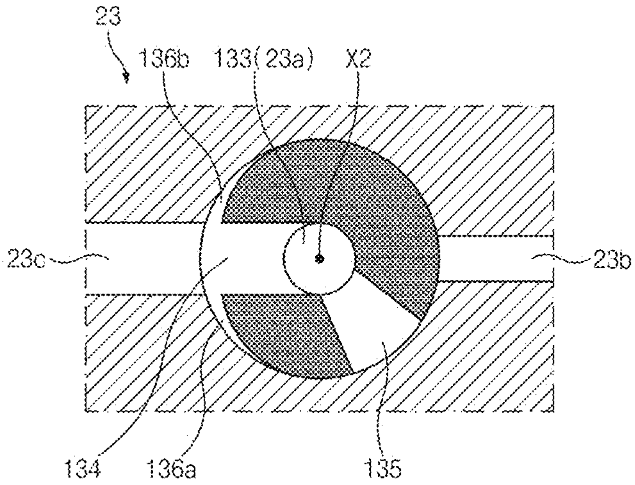
FIG. 5D illustrates a state in which the ball component of the third control valve is in a third position.

Referring to FIG. 5D, when the ball component 132 is in a third position, the first outlet passage 134 may fully communicate with the second outlet port 23*c* so that the second outlet port 23*c* may be fully opened. As the second outlet port 23*c* is fully opened, the refrigerant passing through the second outlet port 23*c* may be directed into the battery chiller 25 without expanding. As the second outlet passage 135 is completely blocked in the valve body 131, the first outlet port 23*b* may be fully closed. Under the condition illustrated in FIG. 5D, the HVAC system may operate in the heating mode for heating the passenger compartment.

Figure 5E:
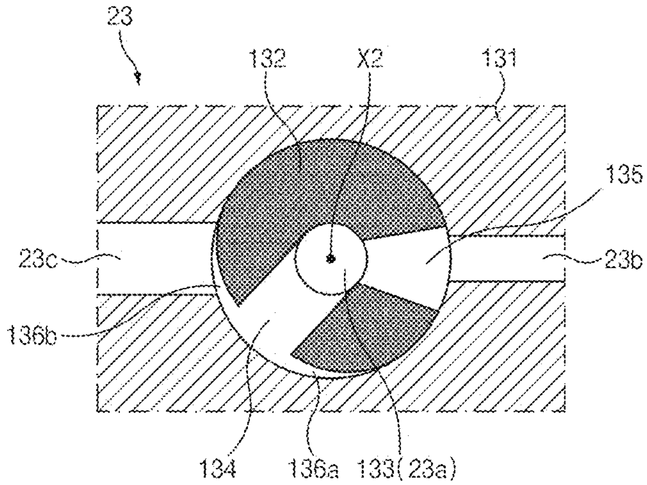
FIG. 5E illustrates a state in which the ball component of the third control valve is in a fourth position.

Referring to FIG. 5E, when the ball component 132 is in a fourth position, the second groove 136*b* may communicate with the second outlet port 23*c* so that the opening degree of the second outlet port 23*c* may be adjusted. The second outlet passage 135 may fully communicate with the first outlet port 23*b* so that the first outlet port 23*b* may be fully opened. Under the condition illustrated in FIG. 5E, the HVAC system may operate in the cooling and battery cooling mode for simultaneously cooling the passenger compartment and cooling the battery.

Referring to FIG. 1, an inlet of the first passage 26*a* of the refrigerant heat exchanger 26 may be located on the downstream side of the second bypass line 42 and the downstream side of the evaporator 15, and an outlet of the first passage 26*a* of the refrigerant heat exchanger 26 may be located on the upstream side of the compressor 11. An inlet of the second passage 26*b* of the refrigerant heat exchanger 26 may be located on the downstream side of the exterior heat exchanger 13 and the downstream side of the first bypass line 41, and the outlet of the second passage 26*b* of the refrigerant heat exchanger 26 may be located on the upstream side of the cooling-side expansion valve 14.

Referring to FIG. 1, the refrigerant circulation path 30 may include a first line 31 extending from the outlet of the compressor 11 to the interior condenser 12, a second line 32 extending from the interior condenser 12 to the first control valve 21, a third line 33 extending from the first outlet port 21*b* of the first control valve 21 to the inlet port 22*a* of the second control valve 22, a fourth line 34 extending from the first outlet port 22*b* of the second control valve 22 to the inlet of the exterior heat exchanger 13, a fifth line 35 connected to the outlet of the exterior heat exchanger 13, a sixth line 36 extending from the fifth line 35 to the inlet of the cooling-side expansion valve 14, a seventh line 37 extending from an outlet of the cooling-side expansion valve 14 to an inlet of the evaporator 15, an eighth line 38 connected to the outlet of the evaporator 15, and a ninth line 39 extending from the eighth line 38 to the inlet of the compressor 11.

The first bypass line 41 and the fifth line 35 may be connected to a junction 36*a* of the sixth line 36, and the first bypass line 41 may extend from the second outlet port 21*c* of the first control valve 21 to the junction 36*a* of the sixth line 36 located on the upstream side of the refrigerant heat exchanger 26.

The second bypass line 42 and the eighth line 38 may be connected to a junction 39*a* of the ninth line 39, and the second bypass line 42 may extend from the second outlet port 22*c* of the second control valve 22 to the junction 39*a* of the ninth line 39.

The distribution line 45 may extend from the second outlet port 23*c* of the third control valve 23 to a junction 38*a* of the eighth line 38.

The HVAC system may further include a shut-off valve 35*a* disposed between the outlet of the exterior heat exchanger 13 and the refrigerant heat exchanger 26. The shut-off valve 35*a* may be located on the upstream side of the junction 36*a* of the sixth line 36. When the first outlet port 22*b* of the second control valve 22 is closed, the shut-off valve 35*a* may be closed so that the refrigerant may bypass the exterior heat exchanger 13 and not be directed into the exterior heat exchanger 13.

When the HVAC system operates in the heating mode in a condition in which the ambient temperature is relatively low (for example, −20° C. to −5° C.), the temperature of the coolant circulating in the coolant circulation path 51 of the coolant system 50 may not be relatively high, so the refrigerant passing through the first passage 24*a* of the water-cooled heat exchanger 24 may fail to sufficiently absorb heat from the second passage 24*b* of the water-cooled heat exchanger 24. Accordingly, the refrigerant may not be sufficiently evaporated in the water-cooled heat exchanger 24. That is, in the condition in which the ambient temperature is relatively low, the coolant of the coolant system 50 may fail to provide enough heat for the evaporation of the refrigerant passing through the water-cooled heat exchanger 24. To deal with this, the HVAC system according to an exemplary embodiment of the present disclosure may allow the refrigerant heat exchanger to additionally provide heat for the evaporation of the refrigerant in the condition in which the ambient temperature is relatively low. Accordingly, the refrigerant may be evaporated in two steps through the water-cooled heat exchanger 24 and the refrigerant heat exchanger 26, whereby the refrigerant may be stably evaporated.

Figure 2:
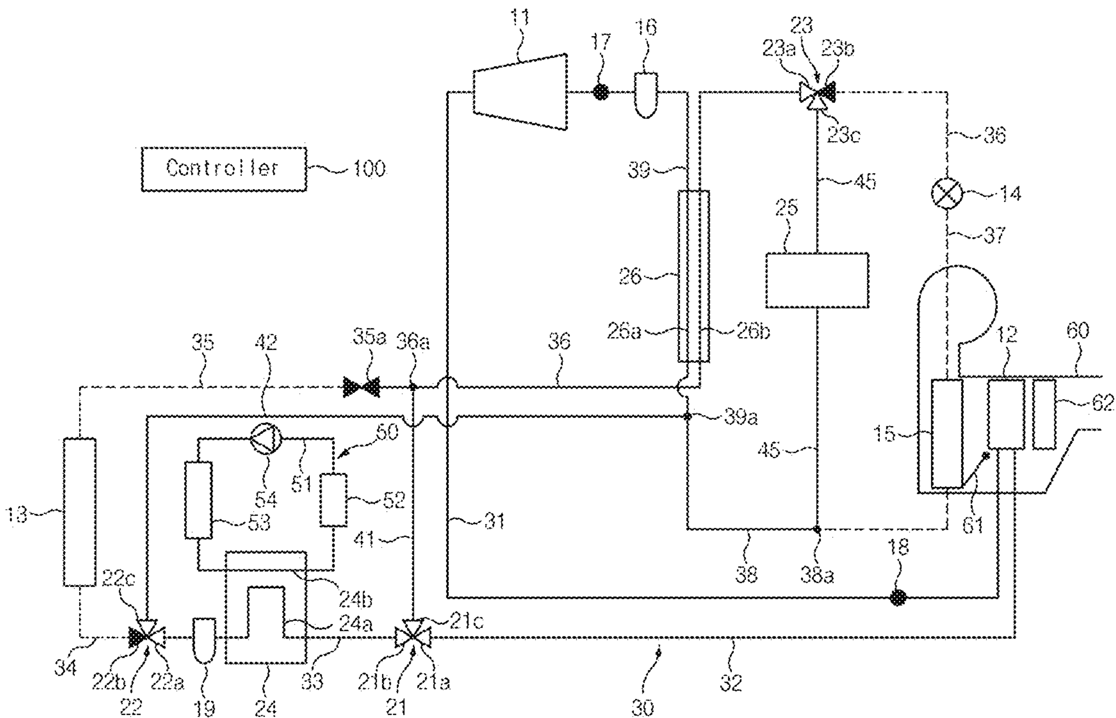
FIG. 2 illustrates a state in which a vehicle HVAC system according to an exemplary embodiment of the present disclosure operates in a heating mode.

Referring to FIG. 2, when the HVAC system operates in the heating mode in the condition in which the ambient temperature is relatively low, the refrigerant compressed by the compressor 11 may be directed into the interior condenser 12, and the interior condenser 12 may be cooled by the air passing through the HVAC case 60 so that the refrigerant passing through the interior condenser 12 may be condensed by the air. The opening degree of the first outlet port 21*b* of the first control valve 21 may be adjusted based on the pressure of the low-pressure refrigerant (the suction pressure of the compressor 11) sensed by the first sensor 17 so that the refrigerant discharged from the first outlet port 21*b* may be expanded, and the opening degree of the second outlet port 21*c* of the first control valve 21 may be adjusted based on the degree of superheat of the refrigerant so that the flow rate of the refrigerant into the first bypass line 41 may be adjusted. Referring to FIG. 4C, as the ball component 112 of the first control valve 21 is in the second position, the groove 116 may communicate with the first outlet port 21*b* so that the opening degree of the first outlet port 21*b* may be adjusted, and the second outlet passage 115 may communicate with the second outlet port 21*c* so that the opening degree of the second outlet port 21*c* may be adjusted. Here, as the overlap area between the groove 116 and the first outlet port 21*b* is adjusted, the opening degree of the first outlet port 21*b* may be adjusted. When the refrigerant is discharged from the first outlet port 21*b* through the groove 116, the refrigerant may be expanded, and accordingly the pressure and temperature of the refrigerant may decrease. As the overlap area between the second outlet passage 115 and the second outlet port 21*c* is adjusted, the opening degree of the second outlet port 21*c* may be adjusted, and accordingly the flow rate of the refrigerant into the first bypass line 41 may be adjusted.

The refrigerant discharged from the interior condenser 12 may be distributed to the water-cooled heat exchanger 24 and the first bypass line 41 through the first outlet port 21*b* and the second outlet port 21*c* of the first control valve 21. The pressure and temperature of the refrigerant discharged from the first outlet port 21*b* may be relatively lowered due to the expansion of the refrigerant compared to the pressure and temperature of the refrigerant flowing into the inlet port 21*a*. The refrigerant discharged from the first outlet port 21*b* may pass through the first passage 24*a* of the water-cooled heat exchanger 24, and the coolant of the coolant system 50 may pass through the second passage 24*b* of the water-cooled heat exchanger 24. Accordingly, the refrigerant passing through the first passage 24*a* of the water-cooled heat exchanger 24 may primarily absorb heat from the coolant passing through the second passage 24*b* of the water-cooled heat exchanger 24 so that the refrigerant may be primarily evaporated. Here, since the ambient temperature is relatively low, the temperature of the coolant may be relatively low so that the evaporation of the refrigerant may not be sufficient.

Since the refrigerant discharged from the second outlet port 21*c* of the first control valve 21 is not expanded, the pressure and temperature of the refrigerant discharged from the second outlet port 21*c* may be maintained the same as the pressure and temperature of the refrigerant flowing into the inlet port 21*a*. Accordingly, the pressure and temperature of the refrigerant discharged from the second outlet port 21*c* may be higher than the pressure and temperature of the refrigerant discharged from the first outlet port 21*b*. The refrigerant discharged from the second outlet port 21*c* may pass through the second passage 26*b* of the refrigerant heat exchanger 26 through the first bypass line 41 and the sixth line 36.

As the shut-off valve 35*a* located on the downstream side of the exterior heat exchanger 13 is closed, the first outlet port 22*b* of the second control valve 22 is closed, the second outlet port 22*c* of the second control valve 22 is opened, and the refrigerant discharged from the first passage 24*a* of the water-cooled heat exchanger 24 may pass through the first passage 26*a* of the refrigerant heat exchanger 26 through the second bypass line 42. The pressure and temperature of the refrigerant passing through the second passage 26*b* of the refrigerant heat exchanger 26 may be higher than the pressure and temperature of the refrigerant passing through the first passage 26*a* of the refrigerant heat exchanger 26. After being primarily evaporated in the water-cooled heat exchanger 24, the refrigerant passing through the first passage 26*a* of the refrigerant heat exchanger 26 may absorb heat from the refrigerant passing through the second passage 26*b* of the refrigerant heat exchanger 26, and accordingly the refrigerant passing through the first passage 26*a* of the refrigerant heat exchanger 26 may be secondarily evaporated. That is, the refrigerant primarily evaporated by the water-cooled heat exchanger 24 may be secondarily evaporated, and thus the evaporation of the refrigerant may be stably performed. The refrigerant discharged from the first passage 26*a* of the refrigerant heat exchanger 26 may be directed into the compressor 11 after passing through the accumulator 16.

The first outlet port 23*b* of the third control valve 23 may be fully closed, and the second outlet port 23*c* of the third control valve 23 may be fully opened. Referring to FIG. 5D, when the ball component 132 of the third control valve 23 is in the third position, the first outlet passage 134 may fully communicate with the second outlet port 23*c* so that the second outlet port 23*c* may be fully opened. As the second outlet port 23*c* is fully opened, the refrigerant passing through the second outlet port 23*c* may not expand but may be directed into the battery chiller 25. The second outlet passage 135 may be completely blocked in the valve body 131 so that the first outlet port 23*b* may be fully closed.

The refrigerant discharged from the second passage 26*b* of the refrigerant heat exchanger 26 may be directed into the battery chiller 25 through the second outlet port 23*c* of the third control valve 23. The refrigerant discharged from the battery chiller 25 may merge with the refrigerant discharged from the water-cooled heat exchanger 24 at the junction 39*a* of the ninth line 39. Thereafter, the refrigerant may pass through the first passage 26*a* of the refrigerant heat exchanger 26 and the accumulator 16, and then it may be directed into the compressor 11.

The refrigerant primarily evaporated by the water-cooled heat exchanger 24 may pass through the first passage 26*a* of the refrigerant heat exchanger 26, and the refrigerant discharged from the interior condenser 12 may pass through the second passage 26*b* of the refrigerant heat exchanger 26. The refrigerant passing through the first passage 26*a* of the refrigerant heat exchanger 26 may absorb heat from the refrigerant passing through the second passage 26*b* of the refrigerant heat exchanger 26 so that the refrigerant primarily evaporated in the water-cooled heat exchanger 24 may be secondarily evaporated in the refrigerant heat exchanger 26.

When the HVAC system operates in the heating mode in the condition in which the ambient temperature is relatively low, the refrigerant may be evaporated twice through the water-cooled heat exchanger 24 and the refrigerant heat exchanger 26, whereby the heat absorption and evaporation of the refrigerant may be stably achieved. As the heat absorption and evaporation of the refrigerant are stably performed, the suction pressure of the compressor 11 may be prevented from being lowered below a threshold pressure, and the compressor 11 may operate at a predetermined RPM so that efficiency of the compressor 11 may be improved. Since the coefficient of performance (COP) of the HVAC system may be improved with the use of the refrigerant, the operation of the electric heater 62 may be minimized, and accordingly electric efficiency of the electric vehicle may be improved.

When the HVAC system operates in the heating and dehumidifying mode in a condition in which the ambient temperature is relatively low (for example, −20° C. to −5° C.), the refrigerant may pass through the cooling-side expansion valve 14 and the evaporator 15 so that the air passing through the evaporator 15 may be dehumidified. When an interior temperature of the passenger compartment reaches a target temperature, the RPM of a blower may be relatively reduced so that the rate of air blown into the passenger compartment may be relatively reduced. As the rate of the blown air is relatively reduced, the interior condenser of the HVAC system may fail to sufficiently release heat to the air, and accordingly the condensation of the refrigerant may be relatively reduced.

Figure 3:
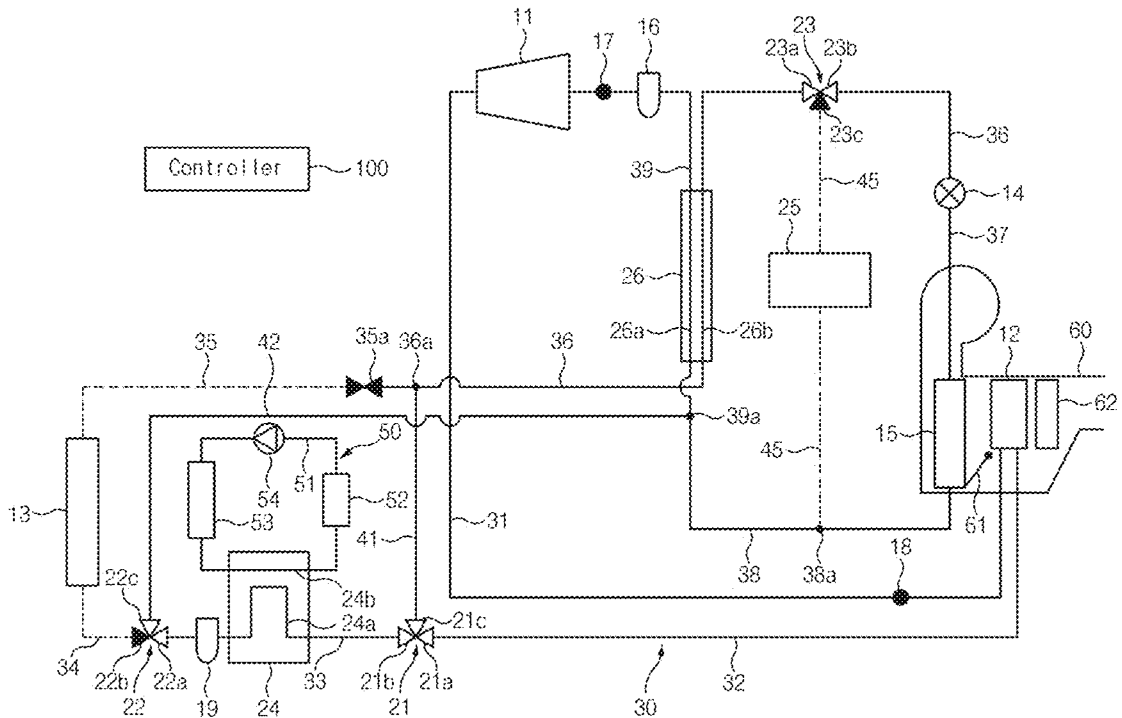
FIG. 3 illustrates a state in which a vehicle HVAC system according to an exemplary embodiment of the present disclosure operates in a heating and dehumidifying mode.

Referring to FIG. 3, when the HVAC system operates in the heating and dehumidifying mode in the condition in which the ambient temperature is relatively low (for example, −20° C. to −5° C.), the refrigerant compressed by the compressor 11 may be directed into the interior condenser 12, and the interior condenser 12 may be cooled by the air passing through the HVAC case 60 so that the refrigerant passing through the interior condenser 12 may be condensed by the air. The opening degree of the first outlet port 21*b* of the first control valve 21 may be adjusted based on the pressure of the low-pressure refrigerant (the suction pressure of the compressor 11) sensed by the first sensor 17 so that the refrigerant discharged from the first outlet port 21*b* may be expanded, and the opening degree of the second outlet port 21*c* of the first control valve 21 may be adjusted based on the degree of superheat of the refrigerant so that the flow rate of the refrigerant into the first bypass line 41 may be adjusted. Referring to FIG. 4C, when the ball component 112 of the first control valve 21 is in the second position, the groove 116 may communicate with the first outlet port 21*b* so that the opening degree of the first outlet port 21*b* may be adjusted, and the second outlet passage 115 may communicate with the second outlet port 21*c* so that the opening degree of the second outlet port 21*c* may be adjusted. Here, as the overlap area between the groove 116 and the first outlet port 21*b* is adjusted, the opening degree of the first outlet port 21*b* may be adjusted. When the refrigerant is discharged from the first outlet port 21*b* through the groove 116, the refrigerant may be expanded, and accordingly the pressure and temperature of the refrigerant may decrease. As the overlap area between the second outlet passage 115 and the second outlet port 21*c* is adjusted, the opening degree of the second outlet port 21*c* may be adjusted, and accordingly the flow rate of the refrigerant into the first bypass line 41 may be adjusted.

The refrigerant discharged from the interior condenser 12 may be distributed to the water-cooled heat exchanger 24 and the first bypass line 41 through the first outlet port 21*b* and the second outlet port 21*c* of the first control valve 21. The pressure and temperature of the refrigerant discharged from the first outlet port 21*b* may be relatively lowered due to the expansion of the refrigerant compared to the pressure and temperature of the refrigerant flowing into the inlet port 21*a*. The refrigerant discharged from the first outlet port 21*b* may pass through the first passage 24*a* of the water-cooled heat exchanger 24, and the coolant of the coolant system 50 may pass through the second passage 24*b* of the water-cooled heat exchanger 24. Accordingly, the refrigerant passing through the first passage 24*a* of the water-cooled heat exchanger 24 may primarily absorb heat from the coolant passing through the second passage 24*b* of the water-cooled heat exchanger 24 so that the refrigerant may be primarily evaporated. Here, since the ambient temperature is relatively low, the temperature of the coolant may be relatively low so that the evaporation of the refrigerant may not be sufficient.

Since the refrigerant discharged from the second outlet port 21*c* of the first control valve 21 is not expanded, the pressure and temperature of the refrigerant discharged from the second outlet port 21*c* may be maintained the same as the pressure and temperature of the refrigerant flowing into the inlet port 21*a*. Accordingly, the pressure and temperature of the refrigerant discharged from the second outlet port 21*c* may be higher than the pressure and temperature of the refrigerant discharged from the first outlet port 21*b*. The refrigerant discharged from the second outlet port 21*c* may pass through the second passage 26*b* of the refrigerant heat exchanger 26 through the first bypass line 41 and the sixth line 36.

As the shut-off valve 35*a* located on the downstream side of the exterior heat exchanger 13 is closed, the first outlet port 22*b* of the second control valve 22 is closed, and the second outlet port 22*c* of the second control valve 22 is opened, the refrigerant discharged from the first passage 24*a* of the water-cooled heat exchanger 24 may pass through the first passage 26*a* of the refrigerant heat exchanger 26 through the second bypass line 42. The pressure and temperature of the refrigerant passing through the second passage 26*b* of the refrigerant heat exchanger 26 may be higher than the pressure and temperature of the refrigerant passing through the first passage 26*a* of the refrigerant heat exchanger 26. After being primarily evaporated in the water-cooled heat exchanger 24, the refrigerant passing through the first passage 26*a* of the refrigerant heat exchanger 26 may absorb heat from the refrigerant passing through the second passage 26*b* of the refrigerant heat exchanger 26, and accordingly the refrigerant passing through the first passage 26*a* of the refrigerant heat exchanger 26 may be secondarily evaporated. That is, the refrigerant primarily evaporated by the water-cooled heat exchanger 24 may be secondarily evaporated, and thus the evaporation of the refrigerant may be stably performed. The refrigerant discharged from the first passage 26*a* of the refrigerant heat exchanger 26 may be directed into the compressor 11 after passing through the accumulator 16.

Referring to FIG. 3, the first outlet port 23*b* of the third control valve 23 may be fully opened, and the second outlet port 23*c* of the third control valve 23 may be fully closed. As the refrigerant passes through the cooling-side expansion valve 14, the refrigerant may be expanded. As the expanded refrigerant passes through the evaporator 15, the refrigerant may be evaporated by the evaporator 15 so that the evaporator 15 may allow the air passing through the HVAC case 60 to be dehumidified. As the refrigerant discharged from the second passage 26*b* of the refrigerant heat exchanger 26 passes through the first outlet port 23*b* of the third control valve 23, the cooling-side expansion valve 14, and the evaporator 15, the pressure and temperature of the refrigerant may be relatively lowered by the cooling-side expansion valve 14 and the evaporator 15. The refrigerant discharged from the evaporator 15 may merge with the refrigerant discharged from the water-cooled heat exchanger 24 at the junction 39*a* of the ninth line 39. Thereafter, the refrigerant may pass through the first passage 26*a* of the refrigerant heat exchanger 26 and the accumulator 16, and then it may be directed into the compressor 11.

Since the temperature of the refrigerant passing through the first passage 26*a* of the refrigerant heat exchanger 26 is lower than the temperature of the refrigerant passing through the second passage 26*b* of the refrigerant heat exchanger 26, the refrigerant passing through the second passage 26*b* of the refrigerant heat exchanger 26 may release heat to the refrigerant passing through the first passage 26*a* of the refrigerant heat exchanger 26 so that the refrigerant passing through the first passage 26*a* of the refrigerant heat exchanger 26 may be secondarily evaporated, and the refrigerant condensed by the interior condenser 12 may be additionally condensed by the refrigerant heat exchanger 26, resulting in subcooling of the refrigerant. As the refrigerant is subcooled, the temperature of the evaporator 15 may be prevented from increasing above the ambient temperature, and the RPM of the compressor 11 may be relatively reduced, and accordingly power consumption of the compressor 11 may be reduced. Since the heating and dehumidification of the passenger compartment may be stably performed using the refrigerant, the operation of the electric heater 62 may be minimized, and accordingly the electric efficiency of the electric vehicle may be improved.

As set forth above, according to exemplary embodiments of the present disclosure, when the HVAC system operates in the heating mode in a relatively low ambient temperature condition, the refrigerant may be evaporated twice through the water-cooled heat exchanger and the refrigerant heat exchanger. As the evaporation of the refrigerant is stably performed, the suction pressure of the compressor may be prevented from being lowered below a threshold pressure, and the compressor may operate at a predetermined RPM, and accordingly the efficiency of the compressor may be improved. Since the coefficient of performance (COP) of the HVAC system may be improved using the refrigerant, the operation of the electric heater may be minimized, and accordingly the electric efficiency of the electric vehicle may be improved.

According to exemplary embodiments of the present disclosure, when the HVAC system operates in the heating and dehumidifying mode in a relatively low ambient temperature condition, the refrigerant may be condensed twice through the interior condenser and the refrigerant heat exchanger. As the condensing of the refrigerant is stably performed, the temperature of the evaporator may be prevented from excessively increasing above a threshold temperature, and accordingly the heating and dehumidification of the passenger compartment may be stably performed using the refrigerant.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A heating, ventilation, and air conditioning (HVAC) system for a vehicle, the system comprising:

a compressor;

an interior condenser disposed on a downstream side of the compressor;

a water-cooled heat exchanger disposed on a downstream side of the interior condenser and configured to transfer heat between a refrigerant and a coolant circulating in a coolant system;

a refrigerant heat exchanger disposed on an upstream side of the compressor and configured to transfer heat between a refrigerant discharged from the water-cooled heat exchanger and a refrigerant discharged from the interior condenser;

a first control valve disposed between the water-cooled heat exchanger and the interior condenser and configured to control a flow of the refrigerant between the interior condenser, the water-cooled heat exchanger, and the refrigerant heat exchanger, wherein the first control valve comprises:

an inlet port in communication with the interior condenser, a first outlet port in communication with the water-cooled heat exchanger, and a second outlet port in communication with a second passage of the refrigerant heat exchanger; and a first bypass line extending from the second outlet port to a downstream side of the second passage of the refrigerant heat exchanger, wherein the first bypass line is directly connected to the second outlet port.

2. The system according to claim 1, wherein the refrigerant heat exchanger comprises:

a first passage through which the refrigerant discharged from the water-cooled heat exchanger passes; and the second passage through which the refrigerant discharged from the interior condenser passes.

3. The system according to claim 1, wherein an opening degree of the first outlet port is configured to be adjusted based on a suction pressure of the compressor.

4. The system according to claim 1, wherein an opening degree of the second outlet port is configured to be adjusted based on a degree of superheat of the refrigerant.

5. The system according to claim 1, wherein the first control valve comprises:

a valve body comprising the inlet port, the first outlet port, and the second outlet port; and a ball component rotatably received in the valve body.

6. The system according to claim 5, wherein the ball component comprises:

an inlet passage in communication with the inlet port;

a first outlet passage and a second outlet passage branching off from the inlet passage; and a groove extending from the first outlet passage, wherein a cross-sectional area of the groove is less than a cross-sectional area of the first outlet passage.

7. The system according to claim 6, wherein the ball component is configured to rotate around a rotation axis, and the rotation axis of the ball component is aligned with a central axis of the inlet port.

8. A heating, ventilation, and air conditioning (HVAC) system for a vehicle, the system comprising:

a compressor;

an interior condenser disposed on a downstream side of the compressor;

a water-cooled heat exchanger disposed on a downstream side of the interior condenser and configured to transfer heat between a refrigerant and a coolant circulating in a coolant system;

a refrigerant heat exchanger disposed on an upstream side of the compressor and configured to transfer heat between a refrigerant discharged from the water-cooled heat exchanger and a refrigerant discharged from the interior condenser, the refrigerant heat exchanger comprising:

a first passage through which the refrigerant discharged from the water-cooled heat exchanger passes; and a second passage through which the refrigerant discharged from the interior condenser passes; and a first control valve disposed between the water-cooled heat exchanger and the interior condenser and configured to control a flow of the refrigerant between the interior condenser, the water-cooled heat exchanger, and the refrigerant heat exchanger, wherein the first control valve comprises:

an inlet port in communication with the interior condenser, a first outlet port in communication with the water-cooled heat exchanger, and a second outlet port in communication with the second passage of the refrigerant heat exchanger;

an exterior heat exchanger disposed on a downstream side of the water-cooled heat exchanger;

a second control valve disposed between the water-cooled heat exchanger and the exterior heat exchanger, wherein the second control valve is configured to control the flow of the refrigerant between the water-cooled heat exchanger, the exterior heat exchanger, and the first passage of the refrigerant heat exchanger; and a first bypass line extending from the second outlet port to a downstream side of the second passage of the refrigerant heat exchanger, wherein the first bypass line is directly connected to the second outlet port.

9. The system according to claim 8, wherein the second control valve comprises:

an inlet port in communication with the water-cooled heat exchanger;

a first outlet port in communication with the exterior heat exchanger; and a second outlet port in communication with the first passage of the refrigerant heat exchanger.

10. The system according to claim 9, wherein the second control valve is configured to allow the first outlet port or the second outlet port to selectively communicate with the inlet port.

11. The system according to claim 9, further comprising a second bypass line extending from the second outlet port to an upstream side of the first passage of the refrigerant heat exchanger, wherein the second bypass line is directly connected to the second outlet port.

12. The system according to claim 8, further comprising:

a cooling-side expansion valve disposed on a downstream side of the exterior heat exchanger;

an evaporator disposed on a downstream side of the cooling-side expansion valve;

a distribution line extending from a point between an outlet of the exterior heat exchanger and an inlet of the cooling-side expansion valve to a point between an outlet of the evaporator and an inlet of the compressor; and a battery chiller fluidly connected to the distribution line.

13. The system according to claim 12, further comprising a third control valve disposed between the second passage of the refrigerant heat exchanger, the inlet of the cooling-side expansion valve, and the distribution line, wherein the third control valve is configured to control the flow of the refrigerant between the second passage of the refrigerant heat exchanger, the cooling-side expansion valve, and the battery chiller.

14. The system according to claim 13, wherein the third control valve comprises:

an inlet port in communication with the second passage of the refrigerant heat exchanger;

a first outlet port in communication with the cooling-side expansion valve; and a second outlet port in communication with the distribution line.

15. A heating, ventilation, and air conditioning (HVAC) system for a vehicle, the system comprising:

a compressor;

an interior condenser disposed on a downstream side of the compressor;

a water-cooled heat exchanger disposed on a downstream side of the interior condenser and configured to transfer heat between a refrigerant and a coolant circulating in a coolant system;

a refrigerant heat exchanger disposed on an upstream side of the compressor and configured to transfer heat between a refrigerant discharged from the water-cooled heat exchanger and a refrigerant discharged from the interior condenser, the refrigerant heat exchanger comprising:

a first passage through which the refrigerant discharged from the water-cooled heat exchanger passes; and a second passage through which the refrigerant discharged from the interior condenser passes; and a first control valve disposed between the water-cooled heat exchanger and the interior condenser and configured to control a flow of the refrigerant between the interior condenser, the water-cooled heat exchanger, and the refrigerant heat exchanger;

an exterior heat exchanger disposed on a downstream side of the water-cooled heat exchanger;

a second control valve disposed between the water-cooled heat exchanger and the exterior heat exchanger, wherein the second control valve is configured to control the flow of the refrigerant between the water-cooled heat exchanger, the exterior heat exchanger, and the first passage of the refrigerant heat exchanger;

a cooling-side expansion valve disposed on a downstream side of the exterior heat exchanger;

an evaporator disposed on a downstream side of the cooling-side expansion valve;

a distribution line extending from a point between an outlet of the exterior heat exchanger and an inlet of the cooling-side expansion valve to a point between an outlet of the evaporator and an inlet of the compressor;

a battery chiller fluidly connected to the distribution line; and a third control valve disposed between the second passage of the refrigerant heat exchanger, the inlet of the cooling-side expansion valve, and the distribution line, wherein the third control valve is configured to control the flow of the refrigerant between the second passage of the refrigerant heat exchanger, the cooling-side expansion valve, and the battery chiller.

16. The system according to claim 15, wherein the third control valve comprises:

an inlet port in communication with the second passage of the refrigerant heat exchanger;

a first outlet port in communication with the cooling-side expansion valve; and a second outlet port in communication with the distribution line.

17. The system according to claim 16, wherein an opening degree of the first outlet port is configured to be adjusted based on a target temperature of the evaporator.

18. The system according to claim 16, wherein an opening degree of the second outlet port is configured to be adjusted based on a temperature of a battery.

19. The system according to claim 16, wherein the third control valve comprises:

a valve body comprising the inlet port, the first outlet port, and the second outlet port; and a ball component rotatably received in the valve body.

20. The system according to claim 19, wherein the ball component comprises:

an inlet passage in communication with the inlet port;

a first outlet passage and a second outlet passage branching off from the inlet passage; and a pair of grooves symmetrically extending from the first outlet passage, wherein a cross-sectional area of each groove is less than a cross-sectional area of the first outlet passage.

* * * * *